(12) United States Patent
Chang et al.

(10) Patent No.: US 6,968,503 B1
(45) Date of Patent: Nov. 22, 2005

(54) XML USER INTERFACE FOR A WORKFLOW SERVER

(75) Inventors: Tipin Ben Chang, Cupertino, CA (US); Chung Jen Ho, Los Altos, CA (US)

(73) Assignee: Quovadx, Inc., San Carlos, CA (US)

( * ) Notice: Subject to any disclaimer, the term of this patent is extended or adjusted under 35 U.S.C. 154(b) by 0 days.

(21) Appl. No.: 09/522,331

(22) Filed: Mar. 9, 2000

(51) Int. Cl.[7] .................. G06F 15/00; G06F 17/00; G06F 17/21; G06F 17/24
(52) U.S. Cl. .................. 715/526; 715/513; 715/523; 707/6
(58) Field of Search .................. 715/501.1, 513, 715/526, 507, 516, 523; 345/760; 707/1, 707/10, 3, 6; 709/203; 717/143

(56) References Cited

U.S. PATENT DOCUMENTS

| | | | |
|---|---|---|---|
| 4,920,514 A | 4/1990 | Aoki | 364/521 |
| 5,786,816 A | 7/1998 | Macrae et al. | 345/339 |
| 5,826,237 A | 10/1998 | Macrae et al. | 705/2 |
| 5,850,221 A | 12/1998 | Macrae et al. | 345/348 |
| 5,898,434 A | 4/1999 | Small et al. | 345/348 |
| 5,918,208 A | 6/1999 | Javitt | 705/2 |
| 5,930,512 A * | 7/1999 | Boden et al. | 717/102 |
| 5,946,659 A | 8/1999 | Lancelot et al. | 705/3 |
| 5,953,704 A | 9/1999 | McIlroy et al. | 705/2 |
| 5,960,403 A | 9/1999 | Brown | 705/2 |
| 6,037,940 A | 3/2000 | Schroeder et al. | 345/348 |
| 6,330,569 B1 * | 12/2001 | Baisley et al. | 707/203 |
| 6,438,540 B2 * | 8/2002 | Nasr et al. | 707/3 |
| 6,446,256 B1 * | 9/2002 | Hyman et al. | 717/143 |
| 6,480,865 B1 * | 11/2002 | Lee et al. | 715/523 |
| 6,507,857 B1 * | 1/2003 | Yalcinalp | 715/513 |
| 6,535,896 B2 * | 3/2003 | Britton et al. | 715/523 |
| 6,721,747 B2 * | 4/2004 | Lipkin | 707/10 |

FOREIGN PATENT DOCUMENTS

EP 0 457 000 11/1991 ........... G06F 15/42

OTHER PUBLICATIONS

Paolo Ciancarine et al., "Managing Complex Documents Over the WWW: A Case Study for XML", IEEE Computer Society, Jul./Aug. 1999, pp. 629-638.*

(Continued)

*Primary Examiner*—Joseph Feild
*Assistant Examiner*—Maikhanh Nguyen
(74) *Attorney, Agent, or Firm*—Thelen Reid & Priest; Marc Hanish

(57) ABSTRACT

A workflow server system is provided which uses an XML namespace designed to execute various workflow server services. The workflow server may include an XML Execution Engine, which uses the XML namespace to execute commands issued by the user from a web browser. The use of the XML namespace allows users to easily modify the user interface and how content is handled without needing to contact the manufacturer of the workflow server or engage in a massive redesign of the server. The Workflow Server passes a user command to an XML Execution Engine, accesses an XML namespace to determine how to execute said command, executes said command, accessing a database if necessary, and returns an XML document back to user for display on the user's web browser, said XML document containing a reference to an XSL file.

21 Claims, 5 Drawing Sheets

OTHER PUBLICATIONS

Lerina Aversano et al. "Integrating Document and Workflow Management Tools using XML and Web Technologies: a Case Study", Research Centre On Software Technology, Department of Engineering, University of Sannio, 2002, pp. 24-33.*

Zulkhairi Dahalin et al. "Workflow Interoperability Using Extensible Markup Language (XML)," School of Information Technology, University Utara Malaysia, Jul. 2002, pp. 513-516.*

* cited by examiner

XML USER INTERFACE FOR A WORKFLOW SERVER

BACKGROUND OF THE INVENTION

1. Field of the Invention

The present invention relates to the field of workflow servers. More specifically, the present invention relates to an XML user interface used in a workflow server.

2. The Background

In computing, workflow is the automatic routing of documents or information to users responsible for working on them. It is generally concerned with providing the information required to support each step of a business cycle to the users responsible for working on them, in a proper format. It is also generally concerned with step-by-step processes, as opposed to simple information sharing, which is more often associated with workgroup, or groupware, systems.

A workflow server (WFS) is often used as the backbone of a workflow system. FIG. 1 is a block diagram illustrating a typical workflow system. As the Internet gains acceptance as an integral part of any business or service, it is becoming more common for users to request information using a browser. The WFS 2 receives requests in the form of formatted strings from a browser 4. A request received from a browser is usually passed to an Application Request Server (ARS) 6, which converts the request into a formatted message and passes it to a Workflow Engine 8 for processing. The WFS is generally linked a database 10, which stores the workflow information. The Workflow Engine 10 then retrieves data from the database 10 and passes to the ARS 6. The ARS 6 may then create a browser readable page using the data and pass it back to the browser 4 for display by the user.

This design, however, has several drawbacks. The user interface for allowing users to make requests is limited by the transaction processing capabilities hard-coded into the ARS 6. Thus, how the ARS 6 handles requests is hard-coded and static. The content of the browser readable page returned by the ARS 6 is also limited by how the ARS 6 is designed and coded. Both these aspects are not easily changeable after the ARS is developed, delivered, and operational. Users who wish to execute a feature of the WFS that is not already handled by the ARS will have to contact the developer of the ARS to add that feature into the application.

What is needed is a design which allows users to easily modify these types of functions without requiring the ARS to be changed.

SUMMARY OF THE INVENTION

A workflow server system is provided which uses an XML namespace designed to execute various workflow server services. The workflow server may include an XML Execution Engine, which uses the XML namespace to execute commands issued by the user from a web browser. The use of the XML namespace allows users to easily modify the user interface and how content is handled without needing to contact the manufacturer of the workflow server or engage in a massive redesign of the server. The Workflow Server passes a user command to an XML Execution Engine, accesses an XML namespace to determine how to execute said command, executes said command, accessing a database if necessary, and returns an XML document back to user for display on the user's web browser, said XML document containing a reference to an XSL file.

DETAILED DESCRIPTION OF A PREFERRED EMBODIMENT

Figure 1:
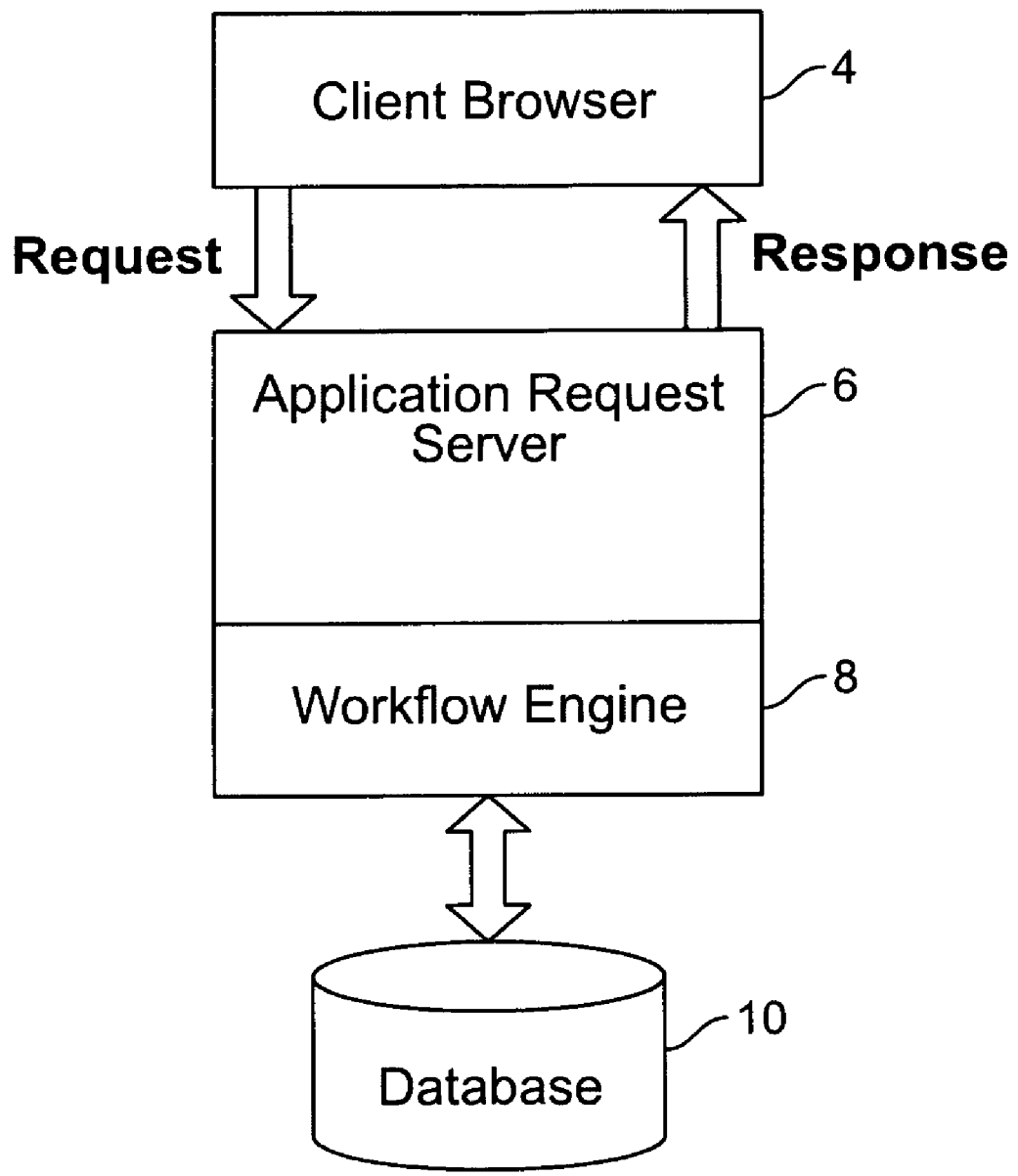
FIG. 1 is a block diagram illustrating a typical workflow system.

In the following description, a preferred embodiment of the invention is described with regard to preferred process steps and data structures. However, those skilled in the art will recognize, after perusal of this application, that embodiments of the invention may be implemented using at least one general purpose computer operating under program control, and that modification of the general purpose computer to implement the components, process steps, and/or data structures described herein would not require undue invention.

All of the syntax specified in this document is described in the augmented Backus-Naur Form (BNF). The augmented BNF includes the following constructs:

The name of a rule is always alphabetic characters in upper case or "-" sign and is separated from its definition by the "::=" sign, such as NAME ::=definition Quotation marks surround literal text, such as "literal".

Unless stated otherwise, the text is case-sensitive.

Elements separated by a bar ("|") are alternatives, e.g., "yes|no" will accept yes or no, such as rule1|rule2

Elements enclosed in parentheses are treated as a single element. Thus, "(very (good|bad) day)" allows the token sequences "very good day" and "very bad day".

The character "*" preceding an element indicates repetition. The full form is "<n>*<m>element" indicating at least <n> and at most <m> occurrences of element. Default values are 0 and infinity so that "*(element)" allows any number, including zero; "1*element" requires at least one; and "1*2element" allows one or two.

Square brackets enclose optional elements, such that "[foo bar]" is equivalent to "*1(foo bar)".

Specific repetition is in the form "<n>(element)", such that "<n>(element)" is equivalent to "<n>*<n>(element)", or exactly <n> occurrences of (element). Thus 2DIGIT is a 2-digit number, and 3ALPHA is a string of three alphabetic characters.

A ";" sign, set off some distance to the right of rule text, starts a comment that continues to the end of line. This is a simple way of including useful notes in parallel with the specifications.

The grammar described by this specification is word-based. Except where noted otherwise, linear whitespace (LWS) can be included between any two adjacent words (token or quoted-string), and between adjacent tokens, without changing the interpretation of a field.

The back-slash sign can be used as the escape character. For example, a double quote inside a test can be denoted as \", and back-slack itself can be denoted as \\.

In accordance with a presently preferred embodiment of the present invention, the components, process steps, and/or data structures are implemented using the XML programming language. This implementation is not intended to be limiting in any way. Different implementations may be used and may include other types of operating systems, computing platforms, and/or computer programs. In addition, those of ordinary skill in the art will readily recognize that devices of a less general purpose nature, such as hardwired devices, devices relying on FPGA (field programmable gate array) or ASIC (application specific integrated circuit) technology, or the like, may also be used without departing from the scope and spirit of the inventive concepts disclosed herewith.

Programming languages (such as Fortran, Java, and C++), allow a programmer to specify calculations, actions, and decisions to be carried out. Markup specification languages (such as Hypertext Markup Language—HTML—and Standard Generalized Markup Language—SGML), on the other hand, provide a programmer with the ability to design ways of describing information, normally for storage, transmission, or processing by a program.

Perhaps the most popular markup specification language is HTML, which is currently used extensively on the Internet as the standard for designing web pages. HTML establishes hypertext structure, where a user may follow paths he or she desires, which are linked independently of where the user is. The advantages of HTML are its simplicity and its portability. However, HTML is a fixed markup language, limiting its intelligence, adaptability, and maintenance.

SGML is a language for defining markup languages. Specific markups may be tailored for specific needs. A defining markup is called a Document Type Declaration (DTD). HTML can actually be thought of as one particular DTD. While SGML is extremely powerful, it is weak in the areas that HTML is strong: simplicity and portability.

XML was designed as a hybrid of HTML and SGML. It was actually created by simplifying the levels of optionality in SGML, redefining some of SGML's internal values and parameters, and it also removes a large number of the more complex and sometimes less-used features which make it harder to write processing programs. XML retains all of SGML's structural abilities which let users define and manage their own document types, so XML does not require a user to use a predefined document type description. This allows groups of people or organizations to create their own customized markup languages for exchanging information in their domain (music, sports, cooking, medicine, etc.).

An XML document is simply nested tags, but they can also be viewed as tree of nodes; for example <A><B>big apple</B><D></D></A> can be thought of as a tree where node "A" is the parent of nodes "B" which has a child text node of string value "big apple", and "D" which does not have any child. Document Object Model (DOM) is a standard to represent any XML document as tree of nodes. Everything in the DOM model is a node, including string values, such as the "big apple" string, which is called a "text" node.

XSL is a language used for expressing stylesheets. These stylesheets allow for the transformation of XML documents into other types of documents. Perhaps the most common example of the use of a stylesheet is one in which the XML language is converted into HTML for viewing on web browsers. When using XSL, an XSL file is usually created which contains definitions and rules on how the transformation is to take place. The browser may then execute these definitions and rules to transform the XML document and display the newly created html document for the user.

The present invention provides an XML-based user interface that allows users to describe the requests to the workflow server for any combination of WFS functions without ever changing the ARS. This technology also allows users to dynamically describe the logic that determines the content of the data that is returned and the format in which it is returned. The present invention is therefore, unlimitedly expandable.

A presently preferred embodiment of the present invention has specific applicability to the medical field, where the utilization of workflow servers has increased significantly due to the medical field's common use of both data (patient records) and processes (not only storing the data, but flowchart type diagnostic procedures which utilize the data to aid physicians). Throughout this application, specific references may be made to the use of this embodiment in the medical field. Despite this, one of ordinary skill in the relevant art would recognize that the present invention may be applied to a great many different types of fields.

According to a presently preferred embodiment of the present invention, a set of XML compliant tags is provided which extends XML to provide users with the ability to uniformly define data as well as actions to be interchanged within the workflow system. These tags are defined in a separate XML namespace. In a presently preferred embodiment of the present invention, this namespace is known as the Confer Name Space, and the XML with this namespace is called CXML. An XSL file may be created to allow for the translation of CXML documents to a more commonly displayable language, such as HTML.

Figure 2:
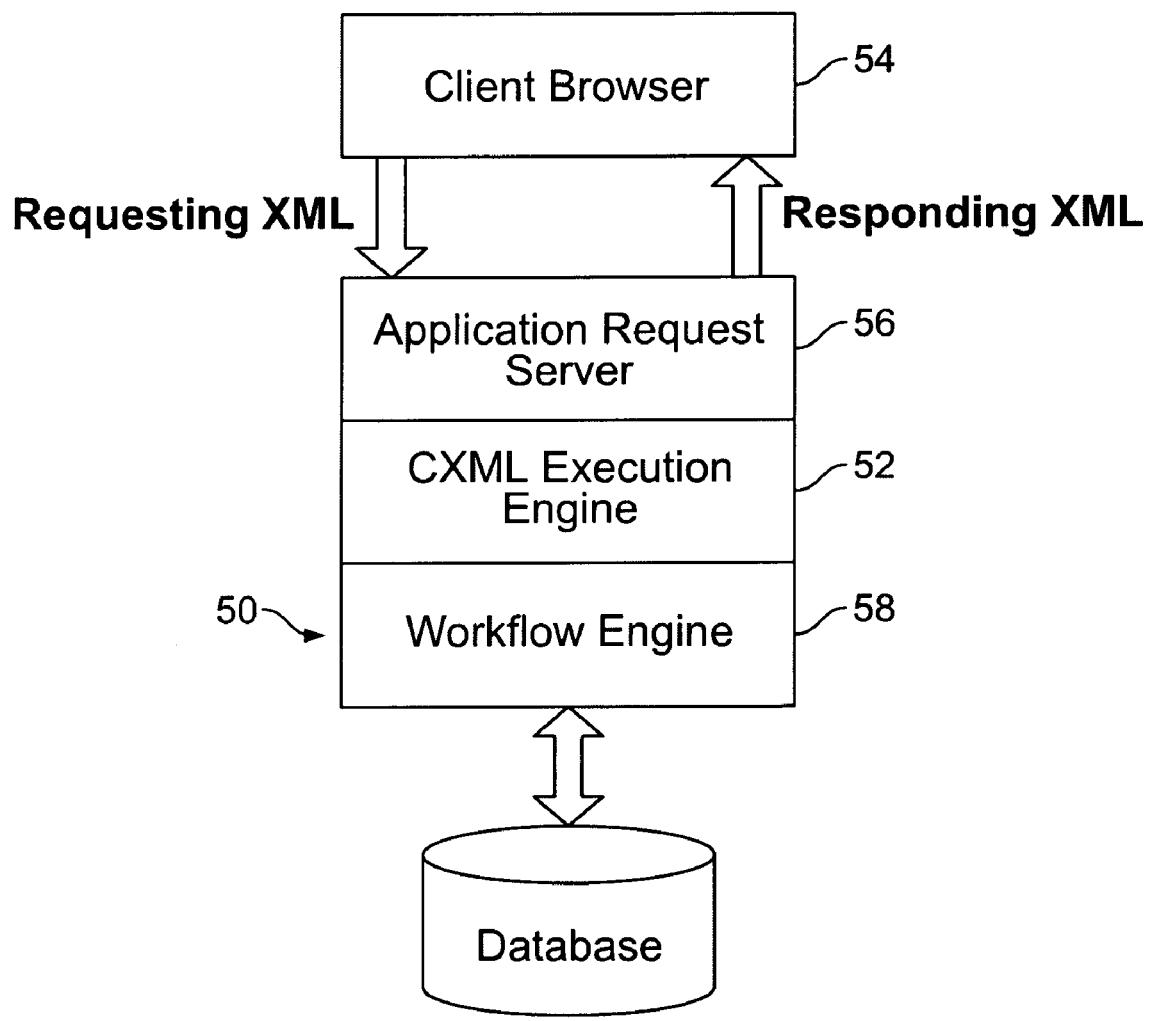
FIG. 2 is a block diagram illustrating a workflow system in accordance with a presently preferred embodiment of the present invention.

FIG. 2 is a block diagram illustrating a workflow system in accordance with the presently preferred embodiment of the present invention. Within the WFS 50 a CXML Execution Engine 52 is provided, which will interpret the tags and then act as a bridge between the requesting browser 54 the Application Request Server 56, and the workflow engine 58.

Each browser page which is to be supported by this technology will contain one or more CXML tags to define database tables, substitute data retrieved from the database, perform a workflow function, or generate a resulting XML page according to the logic described in the tags.

As described above, a user generally utilizes a browser to access the WFS. Thus, web pages are often designed to make the user's input tasks easier. Generally, these web pages will comprise data and processes. The data is either being displayed on the web page or there are forms for the collection of data input. The processes are generally executed by the user as requests to the WFS to perform some task.

In a presently preferred embodiment of the present invention, two types of tags exist: data definition tags and CXML tags. Data definition tags are used inside a task form to describe the schema of Form Data Tables (FDTs) which store the submitted data of a task form. CXML tags provide a way for a solution designed to invoke high level workflow server services and customize what information is sent back to the client browser.

An XML task form may be installed using a form installation utility. After parsing the XML task form, the form installation utility either creates new FDTs or modifies the schema of existing FDTs based on the data definition tags in the task form. Details of FDT creation are presented in the outside the scope of this specification.

Even though CXML tags can be used along with data definition tags in a task form (e.g. to specify initial value of a form field), CXML tags should not be confused with the data definition tags. Data definition tags are only meaningful to a form installation utility to define the schema of FDTs. CXML tags are used in product pages and task forms to invoke run-time server action and to render next page generation.

The following BNF rule may be used to define a task form:

```
TASK-FORM ::=
    "<Confer xmlns:CXML='http://www.confer.com/CXML'>"
        *TYPE-DEF
        *PERSISTED-DATA-COMPONENT
        *NON-PERSISTED-DATA-COMPONENT
    "</Confer>"
)
```

A task form may have a "<Confer>" root node. Within the "<Confer>" node, there may be multiple User-defined type definitions, persisted data whose data will be persisted in the database tables when the task form is filled out and submitted by the user, and non-persisted data components which contains data that is read-only and cannot be changed by the user while submitting a task form. User-defined type definitions specify user defined form field types other than the pre-defined types like "String" or "Numeric. Persisted data components are used to make fields persisted in the FDTs. Each field inside a persisted data component will be persisted in the corresponding FDT. Each data component can have an optional component name. Non-persisted data components are used to make fields not persisted in the FDTs. Each field inside a non-persisted data component will be non-persisted in the corresponding FDT.

The form installation utility first process all the user-defined nodes, then the persisted data components are processed; i.e. a persisted data component can appear before the referenced the user-defined type node. As a result, the order of user-defined type definition, persisted data component, and non-persisted data component nodes does not matter.

By default, data in a task form may stored in the "base FDT" with the table name the same as the form name (after stripping out the .xml or .htm extension from the form's file name). However, a task form designer can specify different tables and/or persistent method for fields of the form using "<BindField>", "<Type>", or "<SequenceDataGroup>".

Nodes inside "<TypeDef>" define user-defined types, which later can be used in a persisted data component to specify the persisted task form data, are of three types. These are single select, multiple select, and multiple column.

A single select type (with a type name specified by the "<Name>" node) defines a set of possible values. The single select type is most useful to Be used by the XSL template for productivity and reusability purposes, as well as to dynamically generate the contents of a pull down list. For example:

```
SIGNLE-SELECT ::=
    "<SignleSelect>"
        "<Name>" IDENTITY "</Name>"
        1*(SINGLE-ITEM)
    "</SingleSelect>"
SINGLE-ITEM ::=
    "<" IDENTITY ">" TEXT "</" IDENTITY ">" |
    "<IDENTITY ">" SINGLE-ITEM "</" IDENTITY ">"
``` may be used to dynamically generate the contents of a pull down list. The following "<TypeDef>" node specifies a single select type "Color", which can have value either "red", "blue", or "green".

```
<TypeDef>
    <SignleSelect>
        <Name> Color </Name>
        <Item> red </Item>
        <Item> blue </Item>
        <Item> green </Item>
    </SingleSelect>
</TypeDef>
```

Later in the "<Data>" section, the "Color" type in a task form field can be referenced. If a "<Value>" node is specified for a single select type field, it must be one of the values defined by the single select type.

The syntax of a multiple select type is very similar to a single select type. A form field with a multiple select type can have multiple values from the list of possible values defined by the multiple select type. In order to normalize the schema storing a multi-value field, a separate FDT is created for each multiple select task field with the table name specified by the "<Name>" node.

```
MULTIPLE-SELECT ::=
    "<MultipleSelect>"
        "<Name>" IDENTITY "</Name>"
        1*(SINGLE-ITEM)
    "</MultipleSelect>"
```

A multiple column type stores the form field in a FDT in a different way than a multiple section type. Other than that, however, the two types are identical. For a multiple column type field, the workflow server will automatically generate a separate column for each possible value in the base FDT table.

```
TYPE-DEF ::=
    "<TypeDef>"
        *(SINGLE-SELECT | MULTIPLE-SELECT | MULTIPLE-COLUMN)
    "</TypeDef>"
```

```
MULTIPLE-COLUMN ::=
    "<MultipleColumn>"
        "<Name>" IDENTITY "</Name>"
        1*(SINGLE-ITEM)
    "</MultipleColumn>"
```

Turning now to persisted data components, form fields inside a persisted data component are persisted in the FDTs. An optional component name can be provided using the "Name" attribute in the "<Data>" node.

```
PERSISTED-DATA-COMPONENT ::=
"<Data" [COMPONENT-NAME] ">"
    *FIELD-DEFINITION
"</Data>
COMPONENT-NAME ::= "Name = \"" IDENTITY "\""
FIELD-DEFINITION ::= FORM-FIELD | UDF-FIELD | SEQUENCE-DATA-GROUP
```

A form field can have an optional field type, which can be either one of the pre-defined types (e.g. "String" or "Numeric"), or a user-defined type specified in the "<Type-Def>" node. Type "String" is assumed if the "<Type>" node is omitted. The initial value(s) of the filed can be specified using the optional "<Value>" node(s). For multiple value types (like multiple select or multiple column types), multiple "<Value>" nodes can be used.

```
FORM-FIELD ::=
    "<" FIELD-NAME ">"
        ["<Type>" FIELD-TYPE "</Type>"]
    * ( "<Value>" TEXT "</Value>" )
        ["<MaxLength>" 1*DIGIT "</MaxLength>"]
        [BIND-FIELD]
    "</" FIELD-NAME ">"
FIELD-NAME ::= IDENTITY
FIELD-TYPE ::= "String" | "Numeric" | "Boolean" | "Date" | "Time" | USER-DEFINED-TYPE
USER-DEFINED-TYPE ::= IDENTITY; the type name must be one defined in TYPE-DEF
```

For a single value types (like single select, String, Numeric), by default, the field is stored in a column of the base FDT. However, this field can be bound to a column of a different table using the "<BindField>" tag. The name of the table, identified by the "<Table>" node, must be one of the FDTs already defined.

```
BIND-FIELD ::=
    "<BindField>"
        "<Table>" IDENTITY "</Table>"
        "<Column>" IDENTITY "</Column>"
    "</BindField>"
```

A Sequence data group is used to represent tabular data in a task form. Unless a "<Table>" node is given, each sequence data group creates a separate FDT table (called the "sequence data table") with name specified by the "<Name>" node. Each column in the tabular data must have a corresponding field name inside the "<Row>" node. An optional "<N_Sequence>" node specifies the number of rows in the table.

```
SEQUENCE-DATA-GROUP ::=
    "<SequenceDataGroup>"
        "<Name>" IDENTITY "</Name>"
        ["<Table>" IDENTITY "</Table>"]
        "<Row>"
            ["<N_Sequence>" 1*DIGIT "</N_Sequence>"]
```

-continued

```
            1*( "<" FIELD-NAME "/>" )
        "</Row>"
    "</SequenceDataGroup>"
```

Turning now to non-persisted data components, nodes inside a non-persisted data component can be any X-expression and are not persisted in the database. An X-expression is the basic building block of a product page and will be described in more detail below. Non-persisted data components can also be named.

```
NON-PERSISTED-DATA-COMPONENT ::=
    "<Data" [COMPONENT-NAME] "Ignore=\"True\">"
        *X-EXPRESSION
    "</Data>"
```

The most typical use of non-persisted data component is to dynamically generate data to be shown when the task form is returned to the client browser. For example, the current patient count can be dynamically returned (using the "<CXML:SQLExec>" tag, defined below), or the latest blood pressure of the patient (from the patient UDF using the "<CXML:Patient>" tag defined below) to be compared with the charted blood pressure stored in the FDT.

Both persisted and non-persisted data components can have an optional "Name" attribute. Once named, accessibility to the data component is under the role-based access control mechanism. Each name data component has a corresponding row in the data access page of the Role Author. Each "cell" in data access page corresponds to a data component/user role combination. A user role can access a data component if the corresponding cell is "checked" in the Role Author. A data component is accessible to a user, if the user has a role that can access the data component.

When a <CXML:Order.Content/> tag (defined later) is evaluated by the CXML executor, only the contents of the data components that are accessible to the user will be evaluated and returned. When a <CXML:SubmitTask> tag is evaluated, only fields in the accessible persisted data component will be updated. For fields in a non-accessible persisted data component, the fields' initial values (specified by the "<Value>" node) will be used as the submitted data to update the FDT.

Turning now to the CXML page structure, an CXML page (or a "product page") is an XML document with some CXML tag nodes (i.e. XML nodes with "CXML:" as their prefix) to trigger some workflow server-side activities, which has the following format.

For direct invocation through a workflow server named-pipe, to invoke a product page, for example "xyz.xml", with parameters "UserName='JDoe'" and "Telephone='1234567'" the client program needs to construct the following XML document text and send it through the CW named-pipe.

```
<Confer xmlns:CXML='http://www.confer.com/CXML/'>
    <CXML:xyz.xml>
        <UserName>JDoe</UserName>
        <Telephone>1234567</Telephone>
    </CXML:xyz.xml>
</Confer>
```

Once the workflow server receives the above request XML document, it invokes CXML page "xyz.xml" with the two input parameters. The invocation result is another XML page, which is returned through the same named-pipe back to the client program.

For a web browser user, the same request of the previous section is submitted through a URL in the following format:

http://nagano/ax/cgi/axcgi.exe?Action=xyz.xml&UserName= Jdoe&Telephone=1234567

```
CXML ::= "<Confer xmlns:CXML='http://www.confer.com/CXML/'" [COMMENT]
">"
    *X-EXPRESSION
"</Confer>"
COMMENT ::= "Comment =\"" TEXT "\""
```

Similar to a task form, the CXML page may begin with a "<Confer xmlns:CXML='http:/www.confer.com/CXML/'>" node with a name-space definition for "CXML" and an optional comment attribute. There can be any number of "x-expressions" inside the <Confer> node. These x-expressions provide instructions to CW server to perform services and generate the return page.

The part of URL before "?" identifies the workflow server machine name (Nagano) and the CGI program name (axcgi.exe). The remaining parts of the URL identify the name of the product page, "xyz.xml", and the two input parameters are collected. CW server then performs the same action as described in the previous section. The resulting XML page is returned and displaced on the client browser window.

```
X-EXPRESSION ::= TEXT | CXML-TAG | XML-NODE
TEXT ::=   any ASCII text except "<" and ">" |
        "<![CDATA[" any ASCII text "]]>"
CXML-TAG ::= all nodes with "CXML" prefix, which are listed in the later sections
XML-NODE ::= any XML node except the ones defined in CXML-TAG
```

An x-expression is the basic building block of a product page. It can either be a DOM text node or a CXML tag, or any other XML node. As specified in the XML language specification, character data can be wrapped around by a "CDATA Section" so that special symbols like "<" and ">" will not be confused to be the begin and end of an element node. A CXML tag is a XML element node with the "CXML" prefix (e.g. <CXML:Login>or <CXML:Case>). A list of the CXML tags will be presented in this specification.

A CXML page contains CXML tags to direct the workflow server to perform server-related action and generate another XML page in return. A CXML page must be installed into the workflow server in order for the workflow server to run the page. Once installed, it can be invoked by direct communications through the named-pipe to the workflow server or by an HTTP URL request from a link from another web page.

The semantics of CXML page execution can be thought of as a pure text substitution guided by the following principles: (1) the evaluation sequence is depth-first; (i.e. the children nodes are executed before their parents); (2) a text node is replaced by its input parameter substituted text value; and (3) any non-CXML tag nodes are not changed.

A CXML tag node is replaced by its execution result. Because the evaluation sequence is depth-first, a CXML tag can be used to compose nested expressions. The innermost expression is evaluated/replaced first. This free-style composability reminiscent of the functional programming language gives CXML its simplicity and expressive power in invoking workflow server functionality and composing return pages.

As mentioned in the previous section, a client program can invoke a CXML page through a CXML tag of the following format.

```
CALL-TAG ::=
    "<CXML:" IDENTITY ".xml>"
        [ WILDCARD-PARAMETER ]
        *INPUT-PARAMETER
    "</CXML:" IDENTITY ".xml>"
WILDCARD-PARAMETER ::= "*"
INPUT-PARAMETER ::= "<NODE-IDENTITY>" TEXT "</NODE-IDENTITY>"
```

A product page, for example "foo.xml" can also contains a page invocation tag to invoke another product page, for example "goo.xml". After execution, the page invocation tag of "goo.xml" is replaced by the resulting XML document of evaluating "goo.xml". In this case, page "foo.xml" is called the parent page, and page "goo.xml" is called the target page. A product page can even contain a page invocation tag to itself, which is similar to a recursive function call.

To pass parameters to the target CXML page, there can be an optional "wildcard parameter", and/or any number of "input parameters". A wildcard parameter, "*", is a shorthand representing the set of input parameters of its parent CXML page so that the target page can "inherit" all the input parameters of its parent. To incorporate special symbols like "<" and ">", the parameter value inside a parameter node<NODE-IDENTITY> can be wrapped inside a CDATA section.

Parameter passing in CXML is call-by-value; i.e. the parameter values are evaluated and copied to the target CXML page as its local variables before the evaluation of the target CXML page. Inside the target CXML page, an input parameter value can be obtained/substituted using the following notation.

VARIABLE-VALUE ::="%" IDENTITY "%"

Any occurrence of the %ParameterName% inside a text node of the target CXML page will be replaced by its corresponding value of the input parameter.

For example, inside a CXML page "ABC.xml" below, another CXML page "DEF.xml" is invoked with parameters "UserName" and "Telephone".

```
<Confer xmlns:CXML='http://www/confer.com/CXML'>
    I am calling page 'DEF.xml' and the result is:
    <CXML:DEF.xml>
        <UserName> John Doe </UserName>
        <Telephone> 1234567 </Telephone>
    </CXML:DEF.xml>
    And Today is <CXML:Server.Today>.
</Confer>
``` and the "DEF.xml" is

```
<Confer xmlns:CXML='http://www/confer.com/CXML'>
    Hello, Mr. %UserName%
    Your Telephone number is %Telephone%
</Confer>
```

After executing "ABC.xml" the resulting XML page that returns back to the user is:

```
<Confer xmlns:CXML='http://www/confer.com/CXML'>
    I am calling page 'DEF.xml' and the result is:
    Hello, Mr. John Doe
```

```
    Your Telephone number is 1234567
    And Today is 02/11/2000.
</Confer>
```

Notice that the page invocation tag of <CXML:DEF.xml> is replace by the result of evaluating "DEF.xml". Also, that the local variables "%UserName%" and "%Telephone%" parameters (see the next Section below) are replaced by the value of the input.

By default, the whole CXML page will be evaluated before the resulting XML document is returned. However, the execution may be terminated a piece of XML nodes may be designated as the execution result of the current page by using the <CXML:Return> tag.

```
RETURN-TAG ::=
    "<CXML:Return>"
        *X-EXPRESSION
    "</CXML:Return>"
```

Note that when a <CXML:Return> node is encountered, only the resulting XML document of the x-expressions inside <CXML:Return> is returned; any partial result before the <CXML:Return> node is discarded.

For example:

```
<Confer xmlns:CXML='http://www.confer.com/CXML/'>
    This is the header part
    <CXML:Return>
        Your user name is '<CXML:User.ID/>'
    </CXML:Return>
    This is the footer part
</Confer>
```

After evaluating the above page, the workflow server returns the following XML page.

```
<Confer xmlns:CXML='http://www.confer.com/CXML/'>
    Your user name is 'John Dole'
</Confer>
```

Notice that neither the XML segment before <CXML:Return> (i.e. 'This is the header part') nor the XML segment after <CXML:Return> (i.e. 'This is the footer part') shows up in the result page. That is, when CW encounters a <CXML:Return> tag, it evaluates all the x-expressions inside <CXML:Return> and uses that as the result of the execution.

Turning now to CXML tags, there are several different types of possible CXML tags. These include CXML control tags (for controlling the flow of CXML page execution), CXML data tags (for returning information generated by the workflow server, also known as "data tags"), and CXML Action tags (for invoking action in the workflow server, also known as "process tags").

Most likely, the creation of CXML documents containing these tags will be done via simple web pages because XML, and specifically CXML, may be too complicated for most users to understand and/or use. The application developer may create CXML pages and installs them onto the workflow server, allowing the user to simply invoke them using the browser. These web pages will reference the correct files, but it is not necessary for the present invention to use such web pages. An embodiment is possible where the user submits a CXML file containing commands directly to the server. These web pages are also highly customizable as different fields and users will almost certainly want different interfaces and functionality. Since these web pages need not be built into the Workflow Server, the customization of them is fairly easy.

Figure 3:
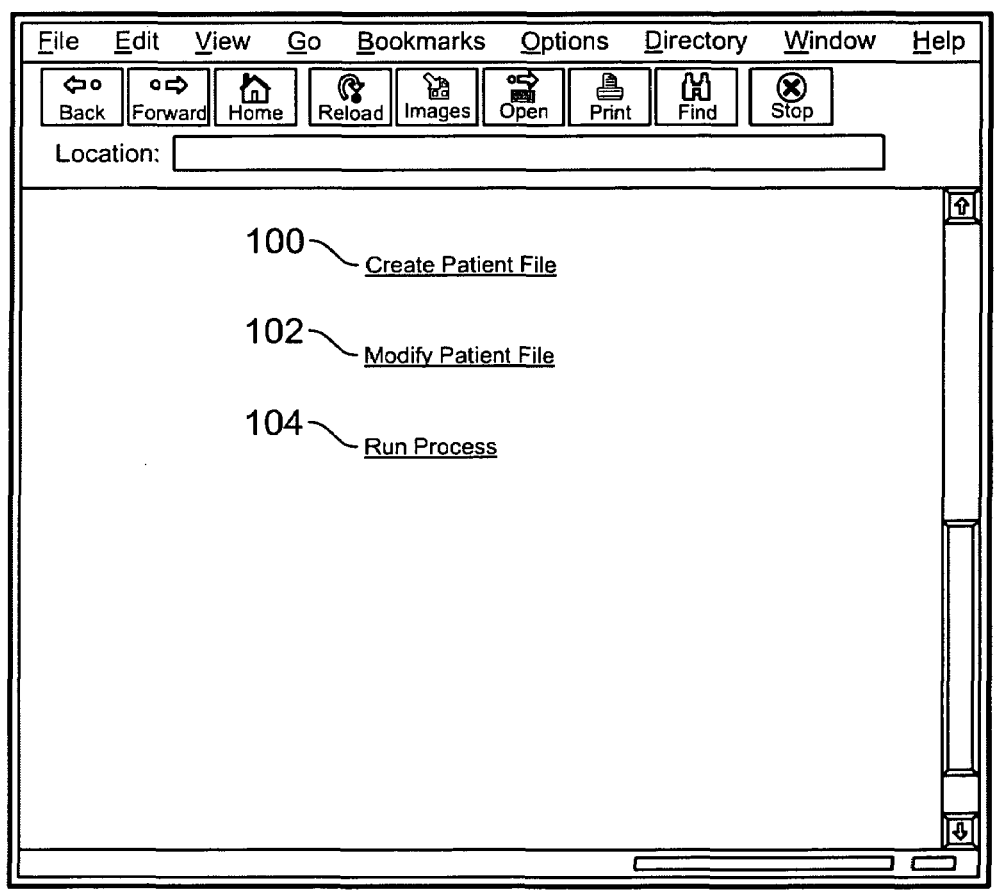
FIG. 3 is a diagram illustrating an example of a browser page that may include process tags.
Figure 4:
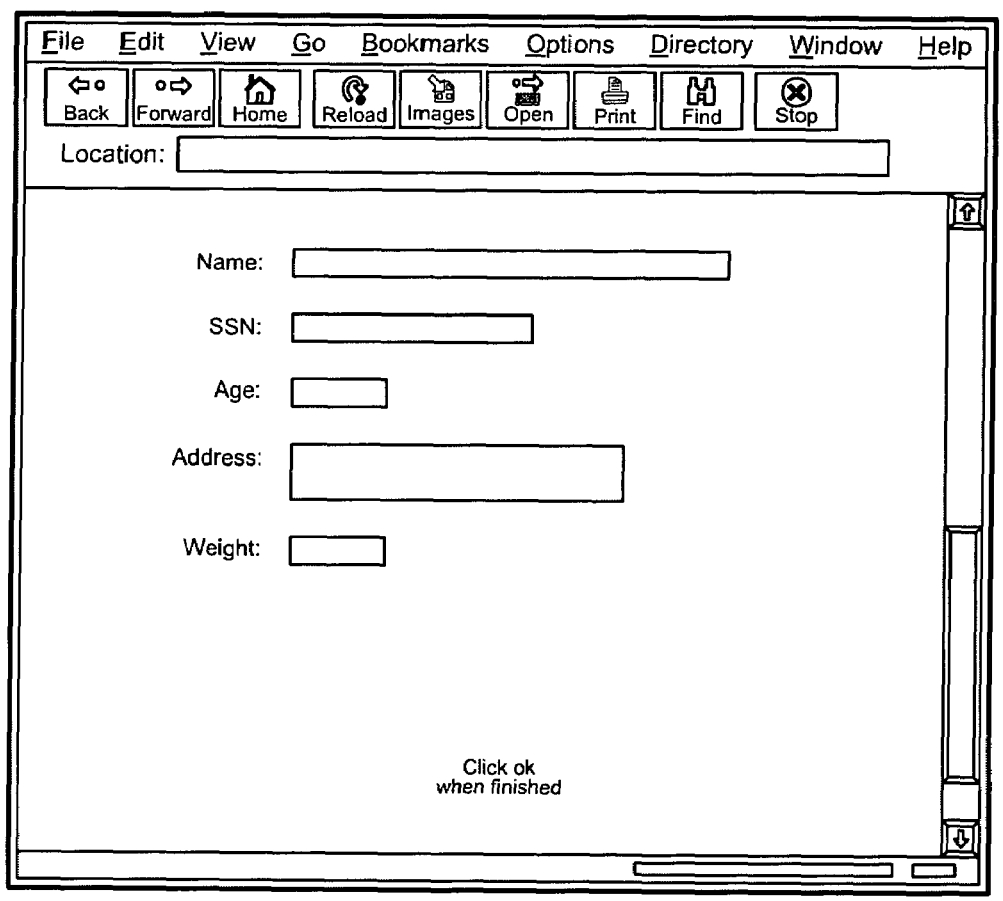
FIG. 4 is a diagram illustrating an example of a browser page that may include data tags.

FIG. 3 is a diagram illustrating an example of a browser page that may include process tags. A user may click on certain links 100, 102, 104 to execute the processes. Many processes, as described above, often will require data to be input as well. For example, if a user wanted to create a patient file, the patient information would then have to be entered. Thus, when a user clicks on a link which executes a process, a new browser page may be displayed which has input fields for the collection of data. FIG. 4 is a diagram illustrating an example of a browser page with several input fields, the input fields corresponding to fields in a task form. The data filled in on the task form is then sent back to the workflow server. The workflow server passes this data as the input parameters to the invoked HXML page to either (1) write data back to FDT, and/or (2) advance workflow, and/or (3) compute the return XML page. One of ordinary skill in the relevant art will recognize that browser pages may be created that invoke both or either data tags and process tags. One of ordinary skill in the relevant art will also recognize that there are many ways to indicate to a browser that a process should be executed other than clicking a link, such as clicking a button, selecting a position in an imagemap, and typing a command.

The tags created for the CXML namespace allow for the broad creation and management of data and processes through the workflow server. Example tags are provided herein to illustrate different features which may be implemented. However, one of ordinary skill in the relevant art will recognize that the tags need not be implemented exactly as described, and that additional tags may be added to provide more features. Additionally, not all the tags described herein are necessary to proper functioning of the present invention. Features which have specific relevance to database management that may be supported by corresponding tags include defining data, substituting data retrieved from the database, performing a workflow function, and generating a resulting XML page according to logic described in the tags.

CXML provides a conditional branching tag similar to the "IF" statement of most programming languages.

```
CASE-TAG ::=
    "<cxml:Case>"
    *CONDITION-ACTION-PAIR
    [ACTION]; optional default action
    "</cxml:Case>"
CONDITION-ACTION-PAIR ::=
    BOOLEAN-TEXT
    ACTION
ACTION ::= "<Action>" *X-EXPRESSION "</Action>"
BOOLEAN-TEXT ::= TEXT
```

The conditions of the CONDITION-ACTION-PAIRs inside <cxml:Case> node are evaluated in sequence. Since every value in XML is text based, <cxml:Case> tag uses the text value of "0" to represent FALSE, anything else represents TRUE. When a TRUE value is evaluated, the x-expressions inside the corresponding <Action> node are evaluated as the result of the <cxml:Case> tag. If no condition is true, the optional default-action node is executed.

The following example can be used to implement a role-based ToDo list. Note that the "<cxml:User.ValidRoleList>" is first replaced by the roles of the current login user. Then the "Match" operator tries to check if sub-string "supervisor" or "nurse" is in the roles of the current user.

```
<cxml:Case>
    <cxml:Expression>
        Match("supervisor", "<cxml:User.ValidRoleList/>")
    </cxml:Expression>
    <Action>
        <cxml:SupervisorToDoList.xml> * </cxml:SupervisorToDoList.xml>
    </Action>
    <cxml:Expression>
        Match("nurse", "<cxml:User.ValidRoleList/>")
    </cxml:Expression>
    <Action>
        <cxml:NurseToDoList.xml> * </cxml:NurseToDoList.xml>
    </Action>
    <Action>
        You must be either a "Supervisor" or a "Nurse" to visit this page
    </Action>
</cxml:Case>
```

To specify the XSL path for the returning page, a "<cxml:stylesheet>" tag may be used.

```
STYLESHEET-TAG ::=
    "<cxml:stylesheet href='" XSL-PATH "'/>"
    XSL-PATH ::= any NT file path specification
```

Any style sheet processing instruction (style sheet PI) like the one below is ignored during the CXML page execution, and they are removed in the resulting XML document. The only way to have a style sheet processing instruction in the resulting XML document is to execute a <cxml:stylesheet> tag. Also note that only the first <cxmlstylesheet> tag defines the style sheet processing instruction; all the later ones are ignored.

The following example specifies the XSL style sheet (located at "... /xsl/DefaultTaskForm.xsl") for the resulting XML page.

```
<cxml:SetCurrentOrder>
    <OrderID> %OID% <OrderID>
</cxml:SetCurrentOrder>
```

-continued

```
:
<cxml:Order.Content/>
<cxml:stylesheet href="../xsl/DefaultTaskForm.xsl"/>
```

Instead of using the execution result as the return page, an HTTP URL can be specified as the return page.

```
STYLESHEET-TAG ::=
    "<cxml:URL>" URL "</cxml:URL>"
    URL ::= any legal HTTP URL string
```

Once a <cxml:URL> is executed, the execution result will be the web page specified by the URL.

There are occasions where one wants to "delay" the evaluation of a CXML tag. This is achieved by adding a "_" in front of a valid CXML tag as follows.

```
DELAY-EVALUATION ::=
    "<cxml:_" NODE-IDENTITY ">"
        *X-EXPRESSION
    "</cxml:_" NODE-IDENTITY ">"
```

The x-expressions inside the delayed evaluation node are first evaluated/replaced. Then the delayed tag is replaced by a CXML node with the leading "_" removed.

A <cxml:Parse> tag may be used to parse ASCII text into XML nodes. This tag is of the form:

PARSE-TAG ::="<cxml:Parse>" TEXT "</cxml:Parse>"

A <cxml:Execute> tag runs the CXML interpreter on the x-expressions inside. This tag is of the form:

EXECUTE-TAG ::="<cxml:Execute>" *X-EXPRESSION "</cxml:Execute>"

The following example uses the <cxml:SQLExec> tag (described below) to read a row from the data base, then use <cxml:Parse> to parse it into XML nodes, and finally execute the XML nodes as a CXML program using the <cxml:Execute> tag.

```
<Confer xmlns:cxml='http://www.confer.com/cxml/'>
    <cxml:Execute>
        <cxml:Parse>
            <cxml:SQLExec RowTitle="">
                SELECT Cxml_Text FROM Per_User_Initialization
                WHER UserID = %UserID%
            </cxml:SQLExec>
        </cxml:Parse>
    </cxml:Execute>
</Confer>
```

This simple program demonstrates how a personalized initialization CXML program may be stored in a database table, "Per User_Initialization", of a given user.

Turning to data tags, all data tags return some information generated by the Workflow Server. After evaluation, the data tag node is in-line replaced by the requested information. One convention used by tags in this category is the "dot" notation, which further specifies the sub-component of the requested information. For example, the ".FullName" in <cxml:User.FullName/> specifies the full name of the user.

SQL is a database language which allows programmers to write programs that interface with a database (for storing, retrieving, etc.) A SQL statement may be executed by using the <cxml:SQLExec> tag. This provides a way to directly access database information from the APS.

```
SQLEXEC-TAG ::=
    "<cxml:SQLExec" [ RDBMS-ATTR ] [ ROWTITLE-ATTR ] [ TALLY-ATTR ] ">"
        TEXT
        [ "<StartIndex>" 1*DIGIT "</StartIndex>" ]
        [ "<RecordsPerPage>" 1*DIGIT "</RecordsPerPage>" ]
        *COLUMN-NAME-ALIAS
        *BIND-ARGUMENT
    "</cxml:SQLExec>"
```

The first text node inside "<cxml:SQLExec>" is the SQL statement to be executed. A "<StartIndex>" node may be to used to skip output rows until the start index (the first row has the index of "1"). When combined with "<RecordsPerPage>", the workflow server can be directed to only return rows starting from start index to start index+records per page.

An optional "RDBMS" attribute can be used to specify the underlying database (either "Oracle" or "SQL Server") that this SQL statement is running under. If that is different from the database that the workflow server is current running on, this <cxml:SQLExec> tag is ignored. "RDBMS" is usually used when the SQL statement is a vendor specific statement. In this case, two <cxml:SQLExec> tags are specified; one for "Oracle" and another for "SQL Server".

RDBMS-ATTR
::="RDBMS=\"Oracle\""|"RDBMS=\"SQL Server\""

The "row title" of the SQL query output can be customized by using the "Element" attribute.

ROWTITLE-ATTR ::="Element=\""IDENTITY "\""

If the "Tally" attribute is specified, a tally (i.e. the total number of rows returned) will be included in the result.

TALLY-ATTR ::="Tally=\""IDENTITY "\""

The "column titles" of the SQL query output can be customized using the column alias, "<ColAlias>", nodes. Note that the number of column aliases must match the number of columns in the query output, otherwise a run-time error will be given.

COLUMN-NAME-ALIAS ::="<ColAlias>" IDENTITY "</ColAlias>"

The "<BindArg>" nodes can be used to "bind" arguments to the "?" inside the SQL query statement. Note that the number of "<BindArg>" nodes must match the number of "?" in the query text, otherwise a run-time error will be given.

```
BIND-ARGUMENT ::=
    "<BindArg>" IDENTITY "</BindArg>"
```

"<BindArg>" is mostly useful if the query parameter can contains special symbols like single quote. For example, the following example only works if parameter %PID% does not contain single quote. Otherwise, the single quote inside %PID% will be confused with the single quotes wrapping around %PID% after the value of %PID% is substituted.

```
<cxml:SQLExec>
    SELECT Patient_SSN, Patient_Home_Phone FROM Patients WHERE PatientID = '%PID%'
</cxml:SQLExec>
```

The solution is to use the "<BindArg>" node to bind %PID% value to the "?" inside the query text as follows.

```
<cxml:SQLExec>
    SELECT Patient_SSN, Patient_Home_Phone FROM Patients WHERE PatientID = '?'
    <BindArg>%PID%</BindArg>
</cxml:SQLExec>
```

The following "<cxml:SQLExec>" tag returns a list of patient social security numbers and home phone numbers of patients who live in a given city, %CityName% This may only run if the workflow server is connecting to a "Oracle" database server. It may also be designed to return only the first 10 records.

```
<cxml:SQLExec RDBMS="Oracle" Element="Target_Patient" Tally="Total_Patients">
    SELECT Patient_SSN, Patient_Home_Phone FROM Patients
WHERE Patient_City = '?'
ORDER BY Patient_name, Patient_Fname
<StartIndex>1</StartIndex>
<RecordsPerPage>10</RecordsPerPage>
<ColAlias> Social Security Number</ColAlias>
<ColAlias> Home Phone </ColAlias>
    <BindArg>%CityName%</BindArg>
</cxml:SQLExec>
```

The execution result will be

```
<Target_Patient>
<Social_Security_Number>216221659</Social_Security_Number>
<Home_Phone>408-321-1234</Home_Phone>
</Target_Patient>
    :
<Target_Patient>
<Social_Security_Number>216221728</Social_Security_Number>
<Home_Phone>510-321-1234</Home_Phone>
</Target_Patient>
<Total_Patients>20</Total_Patients>
<PageList>
<Page1>Current Page</Page1>
<Page2></Page2>
    </PageList>
```

Note that, since there are totally 20 records and 10 records per page, there are two "pages" in the output. And since we only output the first 10 records, so page 1 is the "current page" as indicated in the "<PageList>" node.

A cookie tag may be used such that, after evaluating, this tag will be replaced by the value of cookie with name IDENTITY.

```
COOKIE-TAG ::=
    "<cxml:Cookie." IDENTITY "/>"
```

Each user request is running in a "current request context". The current request context in CW 5.0 includes:

Current session

Current user

Current order

Current patient

Since, after a successful login, each workflow server request must contain a valid session ID, the workflow server automatically sets the current session and current user context based on the passed session ID. However, current patient and order context must be set before a <cxml:Patient> or a <cxml:Order> tag can be processed, otherwise a run-time error will be returned.

```
SETCURRENTORDER-TAG ::=
    "<cxml:SetCurrentOrder>"
        "<OrderID>" ORDERID "</OrderID>"
    "</cxml:SetCurrentOrder>"
SETCURRENTUSER-TAG ::=
    "<cxml:SetCurrentUser>"
        "<UserID>" USERID "</UserID>"
    "</cxml:SetCurrentUser>"
SETCURRENTPATIENT-TAG ::=
    "<cxml:SetCurrentPatient>"
        "<PatientID>" PATIENTID "</PatientID>"
    "</cxml:SetCurrentPatient>"
```

User related information may be retrieved by using the <cxml:User> tag. The "." syntax is used to further specify the specific piece of information about user. The list of possible sub-components of <cxml:User> tag is listed in "USER-COMPONENT".

```
USER-TAG ::=
    "<cxml:User." USER-COMPONENT "/>"
USER-COMPONENT ::= "ID" | "MedID" | "Name" | "FullName" | "Title" |
    "EmailAddress" | "Pager" | "HomeAddress" |
    "Preference" | "HomePhone" | "WorkPhone" |
    "Configuration" | "ValidGroupList" |
    "ValidRoleList" | "ValidUserList" | "AllGroups" |
    "AllRoles" | "AllUsers" | "AllClientSessions"
```

Patient-related information may be retrieved by using the <cxml:Patient> tag in a similar fashion.

```
PATIENT-TAG ::=
    "<cxml:Patient." PATIENT-COMPONENT "/>"
PATIENT-COMPONENT ::= "ID" | "LastName" | "FirstName" | "MiddleName" |
    "FullName" | "SSN" | "CareManager" |
    "CareManagerName" | "CareManagerTitle" | "Group"
    | "Status" | "Sex" | "Street" | "City" | "State"
    | "Zip" | "HomePhone" | "WorkPhone" | "DOB" |
    "Age" | "AssignedPlanUniqueNameList" |
    "ActivePlansList" | "AssignedPlansList" |
    "FieldValue" | "CompletedTasksList" |
    "TabRecord" | "TabRecordsList"
```

A <cxml:SESSION> tag may be used to return the user login session related information.

```
SESSION-TAG ::=
    "<cxml:Session." SESSION-COMPONENT "/>"
SESSION-COMPONENT ::= "LoginRole" | "ID"
```

An <cxml:ORDER> tag returns information related to the current order.

```
ORDER-TAG ::=
    "<cxml:Order." ORDER-COMPONENT "/>"
ORDER-COMPONENT ::= "ID" | "Name" | "IsSimple" | "ActivationTime" |
    "ActivationDate" | "IDSupersedingThisOrder" |
    "IDSupersededByThisOrder" | "TaskNewRecipient" |
    "TaskTransferRecipient" | "TaskPlanRecipient" |
    "TaskDescription" | "TaskException" | "Email" |
    "EmailEnabled" | "EmailDestination" |
    "EmailAdditionalDestination" | "Fax" |
    "FaxEnabled" | "FaxDestination" |
    "FaxAdditionalDestination" | "Print" |
    "PrintEnabled" | "PrintDestination" |
    "PrintAdditionalDestination" | "TaskVariance" |
    "Content"
```

Note that all the components except "Content" are attributes about the order itself (e.g. "ActivationTime" the activation time, or "IsSimple" is this is a simple order, etc . . . ). The "<cxml:Order.Content/>" tag returns the content of the task form, which is associated with the current order. The content is computed as follows.

The task form itself can be viewed as a product page. And "<cxml:Order.Content/>" can be viewed as a CXML page invocation on the task form without any input parameter. If a data component (either persisted or non-persisted) is named, roles that "access" this named component can be specified in an access matrix. If <cxml:OrderContent/> is executed in a session whose login user does not have access right to a component, for example "Diagnosis", inside the task form of this order, then component "Diagnosis" will simply be removed from the resulting XML which replaces <cxml:Order.Content/>. This provides a way to "hide" some sensitive medical data from non-accessible users. For accessible data components, the content of the component will be returned as follows. For non-persisted data component, the component is evaluated as if it is a CXML sub-program and the result is included in the substitution of <cxml:Order-.Content/>. For persisted data component, if the order is charted, the charted data of each field will be returned; if the order is not yet charted, the initial value of each field will be returned.

A <cxml:LIBRARY> tag returns the library-related information.
```
LIBRARY-TAG ::=
    "<cxml:Library." LIBRARY-COMPONENT "/>"
LIBRARY-COMPONENT ::= "VarianceList" | "FormSelect" | "TasksList" |
    "ExternalActionsList" | "EmailAddressList" |
    "FaxNumberList" | "PrintDestinationList"
```

A <cxml:UDF> tag returns user demographic related information including the "User Defined Fields (UDF)".

```
UDF-TAG ::=
    "<cxml:UDF." UDF-COMPONENT "/>"
UDF-COMPONENT ::= "TabList" | "FieldName" | UDF-MNEMONIC
UDF-MNEMOIC ::= any legal UDF mnemonic field name
```

A <cxml: SERVER> tag returns ConferWeb server related information.

```
SERVER-TAG ::=
    "<cxml:Server." SERVER-COMPONENT "/>"
SERVER-COMPONENT ::= "CGI" | "DomainID" | "Borwser" |
    "UserActiveTasksPerPage" | "PatientsPerPage" |
    "PatientActiveTasksPerPage" |
    "PatientTasksPerPage" | "notesPerPage" |
    "PlansPerPage"
```

A <cxml:TEMPLATE> tag returns template related information.

```
TEMPLATE-TAG ::=
    "<cxml:Template." TEMPLATE-COMPONENT "/>"
TEMPLATE-COMPONENT ::= "AvailablePlanList"
```

A <cxml:CXMLAccessMap> tag returns the role-based CXML page access matrix.
CXMLACCESSMAP-TAG ::="<cxml:CXMLAccessMap/>"

A <cxml:DataAccessMap> tag returns the role-based data component access matrix.

```
DATAACCESSMAP ::=
    "<cxml:DataAccessMap/>"
```

In the following example output, it shows that there are four roles in the system, "Doctor", "Nurse", "No Role" and "Security Administrator". Following that is a list of all the product pages, "AddPlan.xml", etc. Then a list of "cell" is presented. Each cell represents the access right of a given role and product page combination. For example, the first cell indicates that a nurse can access (i.e. with right equals "A", or accessible) the "CreateNewContactNote.xml" product page.

```
<AccessMap>
<AllRoles>
<Role>Doctor</Role>
```

-continued

```
<Role>Nurse</Role>
<Role>No Role</Role>
<Role>Security Administrator</Role>
</AllRoles>
<AllComponents>
<Component>AddPlan.xml</Component>
<Component>AddTaskToPlan.xml</Component>
       :
</AllComponents>
<Cell>
<Component>CreateNewContactNote.xml</Component>
<Role>Nurse</Role><Rights>A</Rights>
</Cell>
<Cell>
<Component>CreateNewContactNote.xml</Component>
<Role>SecurityAdministrator</Role><Rights>A</Rights>
</Cell>
</AccessMap>
```

A <cxml:HasGroupAssociation> tag can be used to enforce the "same group user" access control on a patient; when this tag is executed, if the current user does not belong to a group which is included in the current patient's group list, a run-time error message will be returned.

```
HASGROUPASSOCIATION-TAG ::=
    "<cxml:HasGroupAssociation>"
        ["<PatientID>" PATIENTID "</PatientID>"]
    "</cxml:HasGroupAssociation>"
```

The <cxml:Expression> can be used to evaluate the following types of expressions.

Arithmetic expressions (e.g. "%UnitPrice%*%UnitPrice%+4.99")

Boolean expressions (e.g. "%UnitPrice%>99.99")

Process Author expressions (e.g. "This:InitialExam:BloodPressure:Value">160)

These expressions can reference previously charted task form's data (such as the BloodPressure field of the InitialExam form in the example.

Once evaluated, the <cxml:Expression>node will be replaced by a text node of the resulting value. For Boolean expressions, "0" and "1" represents TRUE and FALSE, respectively.

```
EXPRESSION-TAG ::=
    "<cxml:Expression>"
        TEXT
    "</cxml:Expression>"
```

The workflow server may have a built-in unique counter generator. A counter may be defined and a unique number retrieved using the following tag.

```
COUNTER-TAG ::=
    "<cxml:Counter." IDENTITY "/>"
```

A "counter name" must be provided in the tag using the "dot" notation. A counter is consider as a global resource and is persisted, so the counter can be used by many CXML pages. As long as the same counter name is used, the corresponding counter value will be incremented and returned.

Input parameters are treated as local variables of the target page, and their values can be obtained using the "%VariableName%" notation. A <cxml:Variable> tag may also be used to define new local variables, or to change existing variable values.

```
VARIABLE-TAG ::=
    "<cxml:Variable." IDENTITY ">"
        TEXT
    "</cxml:Variable." IDENTITY ">"
```

A new local variable will be created, if the variable is not defined yet. The TEXT node defines the new value for variable.

Turning now to CXML action tags, tags in this category invoke action in the workflow server. The execution result of an CXML action tag is always an empty string.

A <cxml:Login> tag logs in and creates a user session in CW server. Once logged in, the newly created session ID can be returned to the client using the <cxml:Session.ID/> tag.

```
LOGIN-TAG ::=
    "<cxml:Login>"
        "<UserPassword>" TEXT "</UserPassword>"
        "<UserID>" USERID "</UserID>"
        ["<RoleID>" ROLEID "</RoleID>"]
```

-continued

```
        ["<DomainID>" DOMAINID "</DomainID>"]
    "</cxml:Login>"
```

By default, the user is logged in under the set of roles that are assigned to the user, unless the optional Role ID is not provided and the user is logged in only with a particular role. When the optional domain ID is omitted, the default domain, "ax", is assumed.

A <cxml:Logout> tag terminates a user session.

```
LOGOUT-TAG ::=
    "<cxml:Logout>"
        ["<SessionID>" SESSIONID "</SessionID>"]
    "</cxml:Logout>"
```

If the optional session ID is omitted, the current session is logged out.

A <cxml:CreatePatient> tag creates a patient.

```
CREATEPATIENT-TAG ::=
    "<cxml:CreatePatient>"
        "<PatientID>" PATIENTID "</PatientID>"
        "<PatientLastName>" CHAR-NAME "</PatientLastName>"
        *( "<PatientGroup>" GROUPID "</PatientGroup>" )
        "<PatientCareManager>" USERID "</PatientCareManager>"
        ["<PatientFirstName>" CHAR-NAME "</PatientFirstName>"]
        ["<PatientMiddleName>" CHAR-NAME "</PatientMiddleName>"]
        ["<PatientSSN>" SSN "</PatientSSN>"]
    "</cxml:CreatePatient>"
```

A <cxml:AddPlan> tag assigns a work flow plan to a patient.

```
ADDPLAN-TAG ::=
    "<cxml:AddPlan>"
        "<PatientID>" PATIENTID "</PatientID>"
        "<PlanName>" PLANID "</PlanName>"
        ["<Clinician>" USERID "</Clinician>"]
    "</cxml:AddPlan>"
```

A <cxml:ArchivePlans> tag archives plans for a given patient.

```
ARCHIVEPLANS-TAG ::=
    "<cxml:ArchivePlans>"
        "<PatientID>" PATIENTID "</PatientID>"
    "</cxml:ArchivePlans>"
```

A <cxml:ChangePlansClinician> tag changes the owner of a plan.

```
CHANGEPLANSCLINICIAN-TAG ::=
    "<cxml:ChangePlansClinician>"
        "<PatientID>" PATIENTID "</PatientID>"
        "<Clinician>" USERID "</Clinician>"
    "</cxml::ChangePlansClinician>"
```

A <cxml:AddTaskToPlan> tag adds an ad hoc order to a patient's plan.

```
ADDTASKTOPLAN-TAG ::=
    "<cxml:AddTaskToPlan>"
        "<PatitenID>" PATIENTID "</PatitenID>"
        "<SelectedPlan>" PLANID "</SelectedPlan>"
        "<SelectedOrder>" ORDERID "</SelectedOrder>"
    "</cxml:AddTaskToPlan>"
```

A <cxml:CreateUser> tag creates a new user.

```
CREATEUSER-TAG ::=
    "<cxml:CreateUser>"
        "<UserID>" USERID "<UserID>"
        "<UserPassword>" TEXT "<UserPassword>"
        1*( "<UserGroupID>" GROUPID "<UserGroupID>" )
    "</cxml:CreateUser>"
```

A <cxml:UpdateUser> tag updates information related to a user.

```
UPDATEUSER-TAG ::=
    "<cxml:UpdateUser>"
        "<UserID>" USERID "</UserID>"
        "<UserPassword>" TEXT "</UserPassword>"
        1*( "<UserGroupID>" GROUPID "</UserGroupID>" )
    "</cxml:UpdateUser>"
```

A <cxml:DeleteUser> tag deletes a user.

```
DELETEUSER-TAG ::=
    "<cxml:DeleteUser>"
        "<UserID>" USERID "</UserID>"
    "</cxml:DeleteUser>"
```

A <cxml:AssignUserToGroups> tag assigns groups to a user.

```
ASSIGNUSERTOGROUPS::=
    "<cxml:AssignUserToGroups>"
        "<UserID>" USERID "<UserID>"
        1*( "<UserGroupID>" GROUPID "<UserGroupID>" )
    "</cxml:AssignUserToGroups>"
```

A <cxml:RemoveUserFromGroups> tag removes groups from a user's assigned group list.

```
REMOVEUSERFROMGROUP-TAG::=
    "<cxml:RemoveUserFromGroups>"
        "<UserID>" USERID "</UserID>"
        1*( "<UserGroupID>" GROUPID "</UserGroupID>" )
    "</cxml:RemoveUserFromGroups>"
```

A <cxml:AssignUserToRoles> tag assigns roles to a user.

```
ASSIGNUSERTOROLES-TAG::=
    "<cxml:AssignUserToRoles>"
        "<UserID>" USERID "</UserID>"
        1*( "<RoleID>" ROLEID "</RoleID>" )
    "</cxml:AssignUserToRoles>"
```

A <cxml:RemoveUserFromRoles> tag removes roles from a user's assigned roles.

```
REMOVEUSERFROMROLES-TAG::=
    "<cxml:RemoveUserFromRoles>"
        "<UserID>" USERID "<UserID>"
        1*( "<RoleID>" ROLEID "/RoleID>" )
    "</cxml:RemoveUserFromRoles>"
```

A <cxml:CreateRole> tag creates a user role.

```
CREATEROLE-TAG::=
    "<cxml:CreateRole>"
        "<RoleID>" ROLEID "</RoleID>"
        [ "<Description>" TEXT "</Description>" ]
        *( "<UserGroupID>" GROUPID "</UserGroupID>" )
    "</cxml:CreateRole>"
```

A <cxml:UpdateRole> tag updates information related to a role.

```
UPDATEROLE-TAG::=
    "<cxml:UpdateRole>"
        "<RoleID>" ROLEID "<RoleID>"
        [ "<Description>" TEXT "<Description>" ]
        *( "<UserGroupID>" GROUPID "<UserGroupID>" )
    "</cxml:UpdateRole>"
```

A <cxml:DeleteRole> tag removes a role.

```
DELETEROLE-TAG::=
    "<cxml:DeleteRole>"
        "<RoleID>" ROLEID "</RoleID>"
    "</cxml:DeleteRole>"
```

A <cxml:RemoveRolesFromGroups> tag removes a role from a group.

```
REMOVEROLESFROMGROUPS-TAG::=
    "<cxml:RemoveRolesFromGroups>"
        "<RoleID>" ROLEID "</RoleID>"*
        1*( "<UserGroupID>" GROUPID "</UserGroupID>" )
    "</cxml:RemoveRolesFromGroups>"
```

A <cxml:AssignRolesToGroups> tag assigns a role to a list of groups.

```
ASSIGNROLESTOGROUPS-TAG::=
    "<cxml:AssignRolesToGroups>"
        "<RoleID>" ROLEID "</RoleID>"*
        1*( "<UserGroupID>" GROUPID "</UserGroupID>" )
    "</cxml:AssignRolesToGroups>"
```

A <cxml:UpdateGroup> tag updates information about a group.

```
UPDATEGROUP-TAG::=
    "<cxml:UpdateGroup>"
        "<UserGroupID>" GROUPID "</UserGroupID>"
        [ "<Description>" TEXT "</Description>" ]
    "</cxml:UpdateGroup>"
```

A <cxml:CreateGroup> tag creates a group.

```
CREATEGROUP-TAG::=
    "<cxml:CreateGroup>"
        "<UserGroupID>" GROUPID "</UserGroupID>"
        [ "<Description>" TEXT "</Description>" ]
        [ "<RoleID>" ROLEID "</RoleID>"* ]
        [ "<UserID>" USERID "</UserID>"* ]
        [ "<ControlGroup>" GROUPID "</ControlGroup>" ]
    "</cxml:CreateGroup>"
```

A <cxml:DeleteGroup> tag deletes a group.

```
DELETEGROUP-TAG::=
    "<cxml:DeleteGroup>"
        "<UserGroupID>" GROUPID "</UserGroupID>"
    "</cxml:DeleteGroup>"
```

A <cxml:SubmitTask> tag submits a task.

```
SUBMITTASK::=
    "<cxml:SubmitTask>"
        "<OrderID>" ORDERID "</OrderID>"
        "<PatientID>" PATIENTID "</PatientID>"
        *FORM-FIELD-NAME-VALUE-PAIR
    "</cxml:SubmitTask>"
FORM-FIELD-NAME-VALUE-PAIR::=
```

-continued

```
        "<" NODE-IDENTITY ">"
        TEXT
        "</" NODE-IDENTITY ">"
```

A <cxml:SaveForLaterTask> saves-for-late a task.

```
SAVEFORLATERTASK-TAG::=
    "<cxml:SaveForLaterTask>"
        "<OrderID>" ORDERID "</OrderID>"
        "<PatientID>" PATIENTID "</PatientID>"
        *FORM-FIELD-NAME-VALUE-PAIR
    "</cxml:SaveForLaterTask>"
```

A <cxml:SupercedeTask> tag supercedes a task.

```
SUPERCEDETASK-TAG::=
    "<cxml:SupercedeTask>"
        "<OrderID>" ORDERID "</OrderID>"
        "<PatientID>" PATIENTID "</PatientID>"
        *FORM-FIELD-NAME-VALUE-PAIR
    "</cxml:SupercedeTask>"
```

A <cxml:ForwardTask> tag forwards a task to a different user.

```
FORWARDTASK-TAG ::=
    "<cxml:ForwardTask>"
        "<OrderID>" ORDERID "</OrderID>"
        "<PatientID>" PATIENTID "</PatientID>"
        "<RecipientID>" USERID "</RecipientID>"
        "<SessionID>" SESSIONID "</SessionID>"
    "</cxml:ForwardTask>"
```

A <cxml:UpdatePatientDemographics> tag updates information about a patient.

```
UPDATEPATIENTDEMOGRAPHICS-TAG ::=
    "<cxml:UpdatePatientDemographics>"
        "<PatientID>" PATIENTID "</PatientID>"
            "<PatientLastName>" CHAR-NAME "</PatientLastName>"
            "<PatientFirstName>" CHAR-NAME "</PatientFirstName>"
            "<PatientMiddleName>" CHAR-NAME "</PatientMiddleName>"
            "<PatientGroup>" GROUPID "</PatientGroup>"*
            "<PatientCareManager>" USERID "</PatientCareManager>"
            "<PatientSSN>" SSN "</PatientSSN>"
            "<PatientStatus>" PATIENT-STATUS "</PatientStatus>"
            "<PatientDOB>" DATE "</PatientDOB>"
            "<PatientSex>" SEX "</PatientSex>"
            "<PatientStreet>" TEXT "</PatientStreet>"
            "<PatientCity>" TEXT "</PatientCity>"
            "<PatientState>" TEXT "</PatientState>"
            "<PatientZip>" TEXT "</PatientZip>"
            "<PatientHomePhone>" TELEPHONE-NO "</PatientHomePhone>"
            "<PatientWorkPhone>" TELEPHONE-NO "</PatientWorkPhone>"
    "</cxml:UpdatePatientDemographics>"
```

A <cxml:UpdateUDFForm> tag updates a User-Defined Field (UDF).

```
UPDATEUDFFORM-TAG ::=
   "<cxml:UpdateUDFForm>"
      "<PatientID>" PATIENTID "</PatientID>"
   "</cxml:UpdateUDFForm>"
```

A <cxml:CreateNote> tag creates a contact note for a patient.

```
CREATENOTE-TAG ::=
   "<cxml:CreateNote>"
      "<PatientID>" PATIENTID "</PatientID>"
      "<ContactID>" USERID "</ContactID>"
      "<ContactPhone>" TELEPHONE-NO "</ContactPhone>"
      "<ContactIssue>" TEXT "</ContactIssue>"
      "<ContactDetail>" TEXT "</ContactDetail>"
      "<ContactActionTaken>" TEXT "</ContactActionTaken>"
   "</cxml:CreateNote>"
```

A <cxml:UpdateDataMap> tag updates a data component's access rights for a list of roles.

```
UPDATEDATAMAP-TAG::=
   "<cxml:UpdateDataMap>"
      *( "<Cell>" CELL "</Cell>" )
   "</cxml:UpdateDataMap>"
```

CELL ::=COMPONENT-NAME ":" ROLE-NAME ":" ACCESS-RIGHT

The CELL information is a triplet of data component name, role name, and the new access right. The access-right can be "A" for accessible, or "N" for non-accessible. <cxml:UpdateDataMap> updates the access right map of a role on a data component.

A <cxml:UpdateCXMLMap> tag updates a CXML page's access rights for a list of roles.

```
UPDATECXMLMAP-TAG ::=
   "<cxml:UpdateCXMLMap>"
      *( "<Cell>" CELL "</Cell>" )
   "</cxml:UpdateCXMLMap>"
```

A <CXML:UpdateCXMLMapList> tag updates the list of CXML pages that shows up in the access control matrix. Only the pages that show up in the access control matrix can be accessed as an entry point by a role (if the corresponding check box of that role is checked for that page).

```
UPDATECXMLMAPLIST-TAG ::=
   "<cxml:UpdateCXMLMapList>" CXML-PAGE-NAME ":" ACCESS-RIGHT
   "</cxml:UpdateCXMLMapList>"
```

The CXML-PAGE_NAME ":" ACCESS-RIGHT tag either adds a CXML page to the access control matrix (if ACCESS-RIGHT is "A"), or removes it from the access control matrix (if ACCESS-RIGHT is "N").

When a page is returned to the browser, it will be an XML page with a reference to an XLS file. The XLS file will most likely be stored on the client's computer to speed up access to it. The XLS file will contain information on how to handle the XML page with regards to displaying it on the browser.

Figure 5:
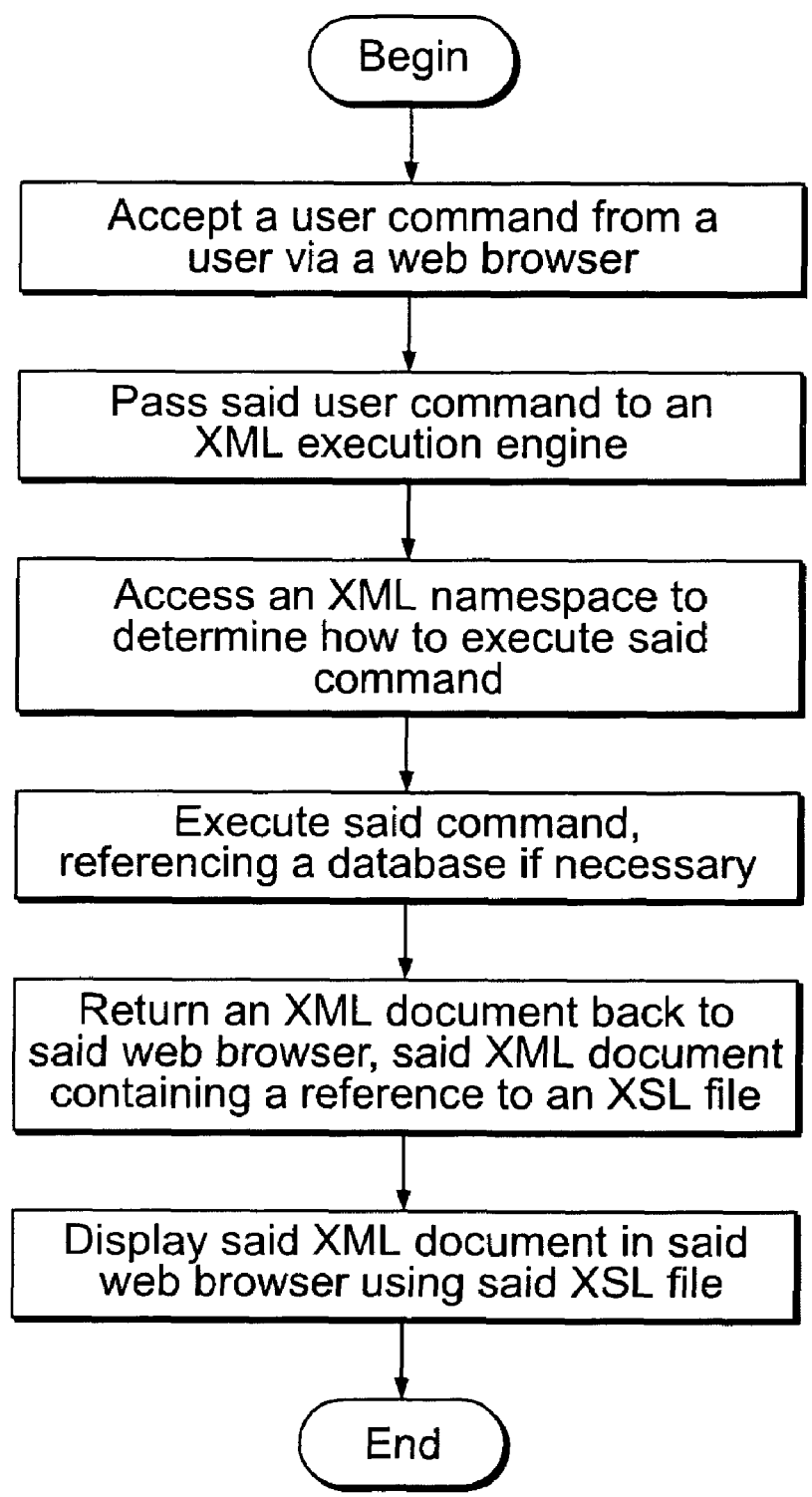
FIG. 5 is a flow diagram illustrating a method for a user to interface with a workflow server in accordance with a presently preferred embodiment of the present invention.

FIG. 5 is a flow diagram illustrating a method for a user to interface with a workflow server in accordance with a presently preferred embodiment of the present invention. At 150, a user command is accepted from a user via a web browser. At 152, the user command is passed to an XML Execution Engine. At 154, the XML Execution Engine accesses an XML namespace to determine how to execute the command. One of ordinary skill in the relevant art will recognize that the XML namespace may actually be designed into the XML Execution Engine. At 156, the command is executed, accessing a database if necessary. At 158, an XML document is returned back to the web browser, the XML document containing a reference to an XSL file. At 160, the XML document is displayed in the web browser using the XSL file.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for a user to interface with a workflow server, including:
   accepting a task form from the user, the task form containing data tags and process tags, the data tags identifying a plurality of first data components and a plurality of second data components, wherein the plurality of first data components consist of data that will be kept in a database table after the task form is filled out and submitted by the user, and the plurality of second data components consists of data that is not modifiable by the user when the user fills out the task form;
   passing the task form to an XML Execution Engine;
   accessing an XML namespace to determine how to execute the process tags and how to interpret the data tags;
   storing the plurality of first data components in one or more form data tables;
   executing the process tags to create an XML document, accessing a database if necessary;
   returning the XML document back to the sad user, said XML document containing a reference to an XSL file and containing the output of the execution of the process tags; and
   displaying the XML document using the XSL file.

2. The method of claim 1, wherein said accepting includes accepting a user document from the user via a web browser.

3. The method of claim 1, wherein the process tags indicate one or more processes to be executed and the data tags indicate information.

4. The method of claim 3, wherein the data tags and process tags are XML tags found in the XML name space.

5. The method of claim 1, wherein the XSL file defines a style sheet for displaying the returned XML document in the web browser.

6. The method of claim 1, wherein the XML namespace contains tags which define data tables, substitute data retrieved from said database, perform workflow functions, and generate the returned XML document according to logic described in the tags.

7. The method of claim 1, wherein the data tags include user-defined types.

8. The method of claim 1, wherein the data tags include a single select type, wherein the single select type defines a set of possible values from which a user may select a single entry.

9. The method of claim 1, wherein the data tags include a multiple select type, wherein the multiple select type defines a set of possible values from which a user may select multiple entries.

10. The method of claim 1, wherein the data tags include a multiple column type, wherein the multiple column type defines a set of possible values from a base form data table, wherein a workflow server generates a separate column for each of the possible values from the base form data table.

11. A program storage device readable by a machine, tangibly embodying a program of instructions executable by the machine to perform a method for a user to interface with a workflow server, the method including:
  accepting a task form from the user, the task form containing data tags and process tags, the data tags identifying a plurality of first data components and a plurality of second data components, wherein the plurality of first data components consist of data that will be kept in a database table after the task form is filled out and submitted by the user, and the plurality of second data components consists of data that is not modifiable by the user when the user fills out the task form;
  passing the task form to an XML Execution Engine;
  accessing an XML namespace to determine how to execute the process tags and how to interpret the data tags;
  storing the plurality of first data components in one or more form data tables;
  executing the process tags to create an XML document, accessing a database if necessary;
  returning the XML document back to the user, said XML document containing a reference to an XSL file and containing the output of the execution of the process tags; and
  displaying the XML document using the XSL file.

12. An apparatus for a user to interface with a workflow server, including:
  means for accepting a task form from the user, the task form containing data tags and process tags, the data tags identifying a plurality of first data components and a plurality of second data components, wherein the plurality of first data components consist of data that will be kept in a database table after the task form is filled out and submitted by the user, and the plurality of second data components consists of data that is not modifiable by the user when the user fills out the task form;
  means for passing the task form to an XML Execution Engine;
  means for accessing an XML namespace to determine how to execute the process tags and how to interpret the data tags;
  means for storing the plurality of first data components in one or more form data tables;
  means for executing the process tags to create an XML document, accessing a database if necessary;
  means for returning the XML document back to the user, said XML document containing a reference to an XSL file and containing the output of the execution of the process tags; and
  means for displaying the XML document using the XSL file.

13. The apparatus of claim 12, wherein means for accepting includes means for accepting a user document from the user via a web browser.

14. The apparatus of claim 12, wherein the process tags indicate one or more processes to be executed and the data tags indicate information.

15. The apparatus of claim 14, wherein the data tags and process tags are XML tags found in the XML name space.

16. The apparatus of claim 14 wherein the XSL file defines a style sheet for displaying the returned XML document in the web browser.

17. The apparatus of claim 12, wherein the XML namespace contains tags which define data tables, substitute data retrieved from the database, perform workflow functions, and generate the returned XML document according to logic described in the tags.

18. The apparatus of claim 12, wherein the data tags include user-defined types.

19. The apparatus of claim 12, wherein the data tags include a single select type, wherein the single select type defines a set of possible values from which a user may select a single entry.

20. The apparatus of claim 12, wherein the data tags include a multiple select type, wherein the multiple select type defines a set of possible values from which a user may select multiple entries.

21. The apparatus of claim 12, wherein the data tags include a multiple column type, wherein the multiple column type defines a set of possible values from a base form data table, wherein a workflow server generates a separate column for each of the possible values from the base form data table.

* * * * *